United States Patent
Benjamin et al.

(10) Patent No.: US 11,880,511 B1
(45) Date of Patent: Jan. 23, 2024

(54) REAL-TIME AUTOMATIC MULTILINGUAL INPUT CORRECTION

(71) Applicant: Kiloma Advanced Solutions Ltd, Gan Yavne (IL)

(72) Inventors: Eyal Benjamin, Yavne (IL); Paaz Cohen-Abramovich, Atlit (IL)

(73) Assignee: Kiloma Advanced Solutions Ltd, Gan Yavne (IL)

( * ) Notice: Subject to any disclaimer, the term of this patent is extended or adjusted under 35 U.S.C. 154(b) by 0 days.

(21) Appl. No.: 18/102,818

(22) Filed: Jan. 30, 2023

(51) Int. Cl.
*G06F 3/023* (2006.01)
*G06F 3/02* (2006.01)

(52) U.S. Cl.
CPC .......... *G06F 3/0237* (2013.01); *G06F 3/0219* (2013.01)

(58) Field of Classification Search
CPC .............................. G06F 3/0237; G06F 3/0219
See application file for complete search history.

(56) References Cited

U.S. PATENT DOCUMENTS

| | | | |
|---|---|---|---|
| 8,229,732 B2 | 7/2012 | Davtchev et al. | |
| 8,756,499 B1* | 6/2014 | Kataoka | G06F 40/274 715/259 |
| 2006/0176283 A1* | 8/2006 | Suraqui | G06F 3/04886 345/169 |
| 2007/0040813 A1* | 2/2007 | Kushler | G06F 3/0237 345/173 |
| 2009/0170536 A1* | 7/2009 | Rang | G06F 40/274 345/169 |
| 2014/0035823 A1* | 2/2014 | Khoe | G06F 3/02 345/171 |
| 2014/0201671 A1* | 7/2014 | Zhai | G06F 40/284 715/773 |
| 2014/0214405 A1* | 7/2014 | Ouyang | G06F 3/04886 704/9 |
| 2015/0177847 A1 | 6/2015 | Swartz et al. | |
| 2016/0224473 A1* | 8/2016 | Acar | G06F 16/328 |
| 2016/0282956 A1* | 9/2016 | Ouyang | G06F 3/04886 |
| 2017/0010800 A1* | 1/2017 | Kataoka | G06F 3/04886 |
| 2017/0185286 A1* | 6/2017 | Beaufays | G06F 3/017 |
| 2017/0286526 A1* | 10/2017 | Bar-Or | G06F 16/248 |
| 2018/0217749 A1* | 8/2018 | Alsharif | G06F 3/0237 |
| 2019/0050746 A1* | 2/2019 | Sanketi | G06N 5/048 |
| 2023/0052623 A1* | 2/2023 | Zhang | G06F 16/337 |

* cited by examiner

*Primary Examiner* — Ariel A Balaoing (57) ABSTRACT

A method and a device for automatically convert input typed using a multi layout physical or virtual keyboard to the correct layout. Some implementations also fix spelling mistakes and set the active layout to the desired layout. When a key such as the space bar is triggered, the implementation may feed the gestures into a machine learning model, the model then may output the estimated correct layout, and followingly cause replacing the characters, symbols or letters, corresponding to the typed keys in displayed words. Based on the estimated or detected language, the software of the implementation may check for spelling mistakes and will correct them.

14 Claims, 10 Drawing Sheets

REAL-TIME AUTOMATIC MULTILINGUAL INPUT CORRECTION

FIELD AND BACKGROUND OF THE INVENTION

The present invention, in some embodiments thereof, relates to multilingual processing, and, more particularly, but not exclusively, language corrections to text.

Ubiquitous automatic correction of user input are based on dictionaries or caching of recent searches, using words in lists or dictionaries. If it doesn't exist, converts to other keyboard layouts and checks the second language's dictionary. Searches for word in dictionary. If doesn't exist, converts to other keyboard layouts and checks second language's dictionary.

Some automatic correction methods may search for a keyboard layout which transforms the incorrect key codes of terminal command into a correct command.

Some automatic correction methods comprise automatic language input mode switching function bypassing the current keystroke, or deleting one or more previous keystrokes and converting the one or more previous keystrokes and the current keystroke into respective counterparts in another language input mode.

Some automatic correction methods apply context cues, which may comprise previously typed words, user history in the current application, typed text input, text visible in a current application, or other aspects of previous user history to detect the right language, giving a likelihood score for corresponding languages.

Some automatic correction and automatic completion methods respond for partial matches too, and ranks the possible fitting words. Ranking may be based on a language model. An exemplary use is on input in a search engine page after the user submits a search query.

SUMMARY OF THE INVENTION

It is an object of the disclosure to provide a method and a device for lingual correction using a multi-layout keyboard based on a machine learning mode mapping sequences of gestures to words in one or more languages estimated best fit.

According to an aspect of some embodiments of the present invention there is provided a method for lingual correction using a multi-layout keyboard comprising:
receive a sequence of user gestures corresponding to a multi-layout keyboard, wherein each layout of the multi-layout keyboard corresponding to a language and comprising a plurality of keys, each key corresponds to at least one character, at least one key in each of the layouts is designated and at least one gesture on the at least one key is assigned as a delimiter;
generate a set of probabilities by processing at least one sub-sequence extracted from the sequence using the delimiter by a machine learning model;
determine a selected layout using the set of probabilities; and
apply the selected layout on at least one word of a plurality of words, wherein the plurality of words correspond to previous and consecutive sub-sequences from the sequence.

According to an aspect of some embodiments of the present invention there is provided a device comprising:
a processor; and
a display in communication with the processor, wherein the processor is configured to:
receive a sequence of user gestures corresponding to a multi-layout keyboard, wherein each layout of the multi-layout keyboard corresponding to a language and comprising a plurality of keys, each key corresponds to at least one character, at least one key in each of the layouts is designated and at least one gesture on the at least one key is assigned as a delimiter;
generate a set of probabilities by processing at least one sub-sequence extracted from the sequence using the delimiter by a machine learning model;
determine a selected layout using the set of probabilities; and
apply the selected layout on at least one word of a plurality of words, wherein the plurality of words correspond to previous and consecutive sub-sequences from the sequence.

According to an aspect of some embodiments of the present invention there is provided a computer readable storage medium having instructions stored thereon, which, when executed by a computer, cause the computer to carry out a method for lingual correction using a multi-layout keyboard comprising:
receive a sequence of user gestures corresponding to a multi-layout keyboard, wherein each layout of the multi-layout keyboard corresponding to a language and comprising a plurality of keys, each key corresponds to at least one character, at least one key in each of the layouts is designated and at least one gesture on the at least one key is assigned as a delimiter;
generate a set of probabilities by processing at least one sub-sequence extracted from the sequence using the delimiter by a machine learning model;
determine a selected layout using the set of probabilities; and
apply the selected layout on at least one word of a plurality of words, wherein the plurality of words correspond to previous and consecutive sub-sequences from the sequence.

Optionally in response to the selected layout apply correction according to the language on the at least one word.

Optionally in response to the selected layout update at least one corresponding character in a displayed sentence comprising the at least one word from an additional language associated with an additional layout using a spelling dictionary of a language associated with the selected layout.

Optionally the set of probabilities is generated using at least one additional subsequence extracted from the sequence using the delimiter.

Optionally the set of probabilities is generated using a graph search on a set of subsequence comprising the at least one additional subsequence, and a target function minimizing number of language switches between adjacent graph nodes corresponding to adjacent subsequences.

Optionally identifying a current layout of the plurality of keys and whether the current layout was manually switched.

Optionally the selected language is determined using a threshold based on the set of probabilities and the current layout.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings and formulae. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to multilingual processing, and, more particularly, but not exclusively, language corrections to text.

A multilingual user might use more than one keyboard layout, which may be associated with different languages, on his system and might accidentally type text while using the wrong keyboard layout for the language—for example: "akuo" instead of "שלום" which may mean hello in Hebrew. Some embodiments of the present disclosure are software may automatically convert the typed input to the correct layout in addition to fixing spelling mistakes. Some implementations may set the active layout to the desired layout.

Known methods may be limited to dictionaries, in accuracy, and in real-time performance.

A software implementation of the present disclosure may receive gestures such as typed keystrokes, gestures on a virtual keyboard, and/or the like and when a key such as the space bar is triggered, the implementation may feed the gestures into a machine learning model, the model then may output the estimated correct layout, which may be associated with a language. When the estimated correct layout is different from the current layout, the system running the implementation may convert the typed keys into the correct layout and replace the characters, symbols or letters, corresponding to the typed keys in displayed words. Based on the estimated or detected language, the software of the implementation may check for spelling mistakes and will correct them.

The machine learning (ML) model may be trained using many ML training based on the typed words, i.e. without context. The training data may comprise datasets which include texts in different languages, labeled by language. Each language's keyboard layout may be mapped to the English QWERTY layout, or alternatively to any other fixed representation of keyboard keys. Dataset texts may be converted to English QWERTY layout based on the mappings. Texts may be split into words, labeled by language. The model may be trained as a classifier with words as input, languages as classes, and optionally languages may be organized in clusters or language family hierarchy, wherein a group of languages may be estimated as an interim stage.

During inference, word, as separated by a delimiter such as a space bar, may be converted to English QWERTY layout. The ML model may receive the word as input. The output of the ML model may be a probability for each language, however other formats such as a most likely language may be generated. Some implementations comprise On-Device Training Model which is continuously trained on the user's device based on the user's typing data.

Alternatively the ML training may relate to the context. The model may be trained similarly, but splitting dataset texts into word n-grams ranging between 1 to multiple words in the same language. The model may receive either one or multiple words, and output language probabilities. Implementations may use the machine learning model for real-time input correction.

The machine learning may provide better accuracy, and real-time language correction may provide spelling correction in addition to converting the keyboard layout, while applying online learning for adapt to user specific writing habits.

Before explaining at least one embodiment of the invention in detail, it is to be understood that the invention is not necessarily limited in its application to the details of instructions and the arrangement of the components and/or methods set forth in the following description and/or illustrated in the drawings and/or the Examples. The invention is capable of other embodiments or of being practiced or carried out in various ways.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations may be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer readable storage medium, also referred to as computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor.

Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing.

A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
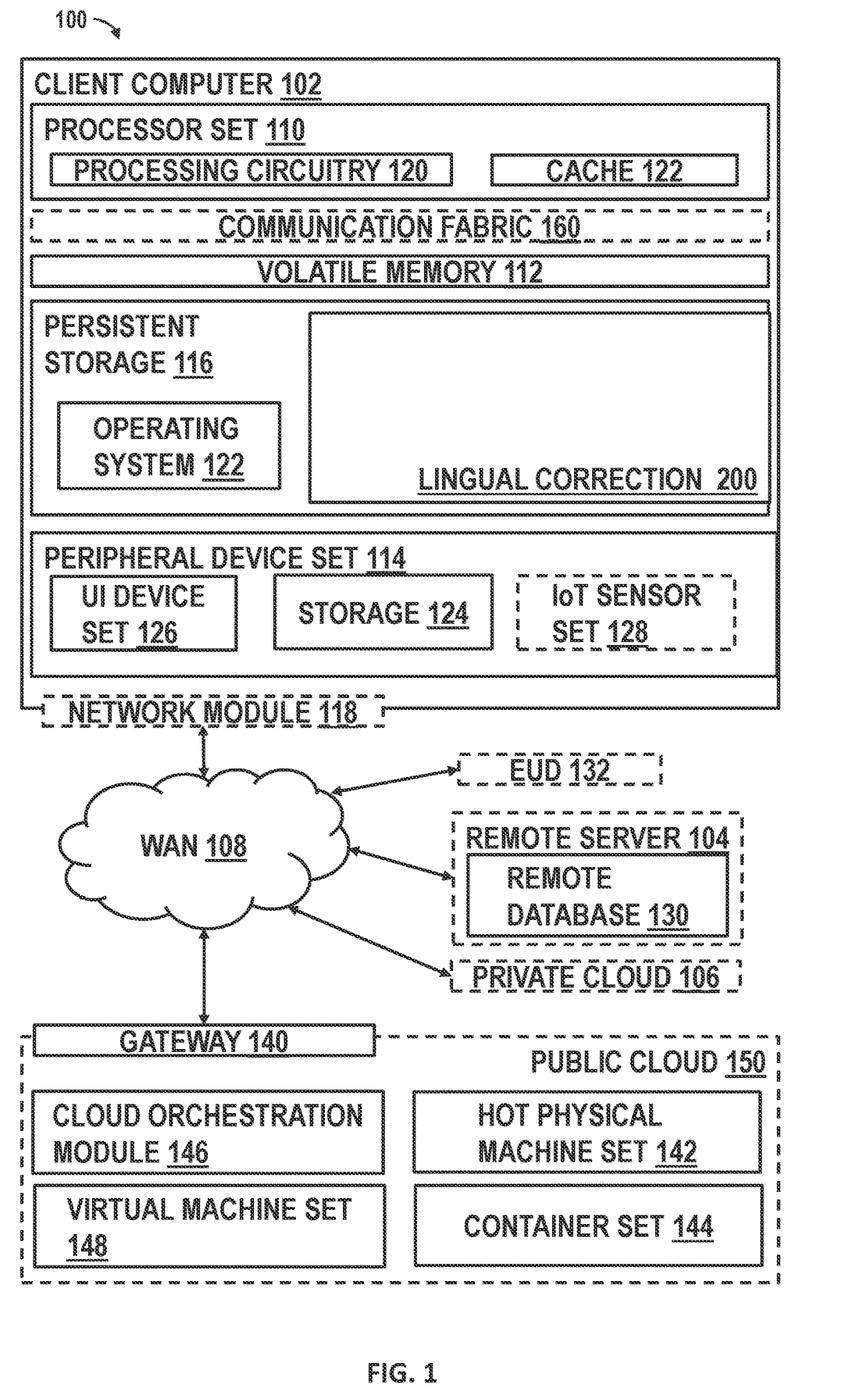
FIG. 1 is a schematic illustration of an exemplary system for lingual correction, according to some embodiments of the present disclosure.
Figure 2:
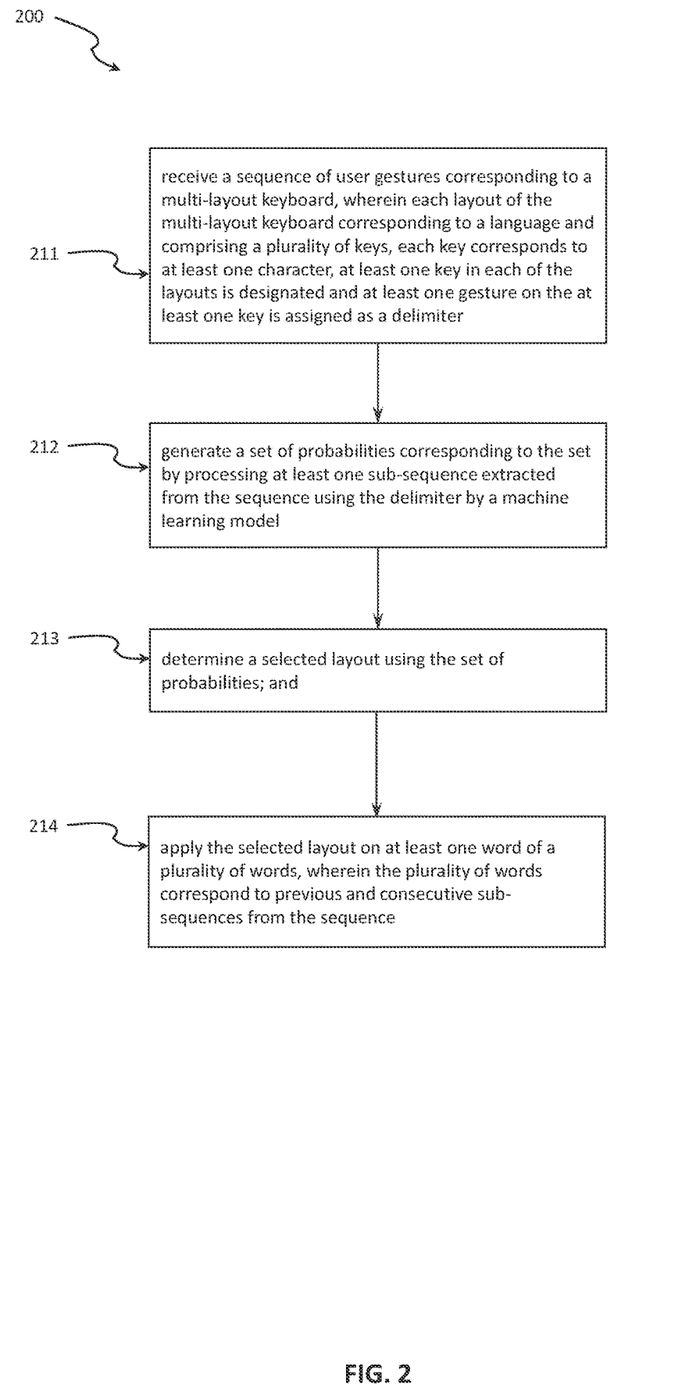
FIG. 2 is a flowchart of an exemplary process for lingual correction, according to some embodiments of the present disclosure.

Referring now to the drawings, FIG. 1 is a schematic illustration of an exemplary system for lingual correction, according to some embodiments of the present disclosure. An exemplary client computer system 100 may be used for executing execute processes such as 200 for online language and spelling correction of typed text and similar tasks. Further details about these exemplary processes follow as FIG. 2 is described. It should be noted that a system may comprise different component and be within the scope of the claims.

Computing environment 100 contains an example of an environment for the execution of at least some of the computer code involved in performing the inventive methods, such as lingual correction 200. In addition to block 200, computing environment 100 includes, for example, computer 102, wide area network (WAN) 108, remote server 104, public cloud 150, and private cloud 106. In this embodiment, computer 102 includes processor set 110 (including processing circuitry 120 and cache 134), communication fabric 160, volatile memory 112, persistent storage 116 (including operating system 122 and block 200, as identified above), peripheral device set 114 (including user interface (UI), device set 126, storage 124, and Internet of Things (IoT) sensor set 128), and network module 118. In some implementation the service may be provided remotely and the computing environment may further include an end user device 132, having its own UI device set, and the like. Remote server 104 includes remote database 130. Public cloud 150 includes gateway 140, cloud orchestration module 146, host physical machine set 142, virtual machine set 148, and container set 144.

COMPUTER 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. The computer may be operated by the end user directly or remotely using the network module 118. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 102, to keep the presentation as simple as possible. Computer 102 may be located in a cloud, even though it is not shown in a cloud in FIG. 1. On the other hand, computer 102 is not required to be in a cloud except to any extent as may be affirmatively indicated.

END USER DEVICE (EUD) 132 may be any computer system that is used and controlled by an end user (for example, a customer of an enterprise that operates computer 102), and may take any of the forms discussed above in connection with computer 102. EUD 132 typically receives helpful and useful data from the operations of computer 102. For example, in a hypothetical case where computer 102 is designed to provide lingual corrections to an end user, this recommendation would typically be communicated from network module 118 of computer 102 through WAN 108 to EUD 132. In this way, EUD 132 can display, or otherwise present, the recommendation to an end user. In some embodiments, EUD 132 may be a client device, such as thin client, heavy client, mainframe computer, desktop computer and so on.

PROCESSOR SET 110 includes one, or more, computer processors of any type now known or to be developed in the future. For example, a processor set may include one or more of a central processing unit (CPU), a microcontroller, a parallel processor, supporting multiple data such as a digital signal processing (DSP) unit, a graphical processing unit (GPU) module, and the like, as well as optical processors, quantum processors, and processing units based on technologies that may be developed in the future. Processing circuitry 120 may be distributed over multiple packages, for example, multiple, coordinated integrated circuit chips. Processing circuitry 120 may implement multiple processor threads and/or multiple processor cores. Cache 134 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 102 to cause a series of operational steps to be performed by processor set 110 of computer 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 134 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 116.

COMMUNICATION FABRIC 160 is the signal conduction paths that allow the various components of computer 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 102, the volatile memory 112 is located in a single package and is internal to computer 102, but, alternatively or additionally, the volatile memory may be distributed over multiple packages and/or located externally with respect to computer 102.

PERSISTENT STORAGE 116 is any form of non-volatile storage for computers that is now known or to be developed in the future. The non-volatility of this storage means that the stored data is maintained regardless of whether power is being supplied to computer 102 and/or directly to persistent storage 116. Persistent storage 116 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 102. Data communication connections between the peripheral devices and the other components of computer 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet.

In various embodiments, UI device set 126 may include components such as a display screen, which may also be a touch screen, speaker, microphone, wearable devices (such as goggles and smart watches), keyboard, mouse, printer, touchpad, game controllers, cameras, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 102 is required to have a large amount of storage (for example, where computer 102 locally stores and manages a large database) then this storage may be provided by peripheral storage devices designed for storing very large amounts of data, such as a storage area network (SAN) that is shared by multiple, geographically distributed computers. IoT sensor set 128 is made up of sensors that can be used in Internet of Things applications. For example, one sensor may be a thermometer and another sensor may be a motion detector.

NETWORK MODULE 118 is the collection of computer software, hardware, and firmware that allows computer 102 to communicate with other computers through WAN 108. Network module 118 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 118 are performed on the same physical hardware device. In other embodiments (for example, embodiments that utilize software-defined networking (SDN)), the control functions and the forwarding functions of network module 118 are performed on physically separate devices, such that the control functions manage several different network hardware devices. Computer readable program instructions for performing the inventive methods can typically be downloaded to computer 102 from an external computer or external storage device through a network adapter card or network interface included in network module 118.

WAN 108 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

REMOTE SERVER 104 is any computer system that serves at least some data and/or functionality to computer 102. Remote server 104 may be controlled and used by the same entity that operates computer 102. Remote server 104 represents the machine(s) that collect and store helpful and useful data for use by other computers, such as computer 102. For example, in a hypothetical case where computer 102 is designed and programmed to provide a recommendation based on historical data, then this historical data may be provided to computer 102 from remote database 130 of remote server 104.

PUBLIC CLOUD 150 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 150 is performed by the computer hardware and/or software of cloud orchestration module 146. The computing resources provided by public cloud 150 are typically implemented by virtual computing environments that run on various computers making up the computers of host physical machine set 142, which is the universe of physical computers in and/or available to public cloud 150. The virtual computing environments (VCEs) typically take the form of virtual machines from virtual machine set 148 and/or containers from container set 144. It is understood that these VCEs may be stored as images and may be transferred among and between the various physical machine hosts, either as images or after instantiation of the VCE. Cloud orchestration module 146 manages the transfer and storage of images, deploys new instantiations of VCEs and manages active instantiations of VCE deployments. Gateway 140 is the collection of computer software, hardware, and firmware that allows public cloud 150 to communicate through WAN 108.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 150, except that the computing resources are only available for use by a single enterprise. While private cloud 106 is depicted as being in communication with WAN 108, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 150 and private cloud 106 are both part of a larger hybrid cloud.

Referring now to FIG. 2, which is a flowchart of an exemplary process schematic illustration of an exemplary system for lingual correction, according to some embodiments of the present disclosure. According to some embodiments of the present disclosure. The processing circuitry 120 may execute the exemplary process 200 for a variety of purposes involving lingual correction, for typing text or similar sequences of symbols in an application supporting different languages and/or symbol sets.

The exemplary process 200 starts, as shown in 211, as the system receives a sequence of user gestures corresponding to a multi-layout keyboard, wherein each layout of the multi-layout keyboard corresponding to a language and comprising a plurality of keys, each key corresponds to at least one character, at least one key in each of the layouts is designated and at least one gesture on the at least one key is assigned as a delimiter.

The gestures may comprise keystrokes on keyboard, touches or movement over a touch screen, making hand signs in front of an infrared or an optical sensor, moving an input device, and/or the like.

The sequence may be acquired by the user interface (UI) device set 126, which may comprise a keyboard. The keyboard may be physical or virtual, and may comprise displaying keys, for example on a touch screen, using a projector, on a LED screen, and/or the like. Alternatively, the sequence may be received from a EUD 132, through the network module 118.

The layouts may be similar to that of a standard 'qwerty' keyboards, for example keyboards that vary in specific keys such as Danish keyboard or 'qwertz', Keyboards for non-Latin languages such as Arabic, Hebrew, Greek, Cyrillic, Georgian, Hindu, Kanji, Simplified Japanese, and/or the like, as well as graphic symbols, historical languages, layouts adapted for programming languages, and the like.

Some keys in some layout may be associated with a specific character, however some keys may vary their associated character according to gesture types such as direction, or additional keys such as 'alt' or 'shift'. A character may be a letter, a delimiter, a sign, a symbol, and/or the like. One or more characters may be referred to as a token.

Some keys may be enlarged and/or have a location shared by many layouts such as space bar, also referred to as whitespace, enter, and the like. The delimiter may be from a set of one or more characters, such as whitespace, a comma, a hyphen, a period, a tab, a newline, and the like, and may be enlarged or have fixed location among different layouts, however other delimiters may be used. The exemplary process 200 continues, as shown in 212, with generating a set of probabilities by processing at least one sub-sequence extracted from the sequence using the delimiter by a machine learning model.

The machine learning model may be wrapped in a module, comprising pre-processing, post processing, glue logic, control, and/or the like. The machine learning may store parameters on some or all parts of the storage 124, as well as the public cloud 150 or a private cloud 106, however more proximal storage such as the video random memory on the volatile storage 112 may be used to enhance performance.

The set of probabilities may be defined for a language, a layout or both, as languages and layouts, though characterized by correspondence, layouts and languages may have a relation of other than one to one. For example, more than one layout may correspond to English, and a layout may be shared between Croatian and Polish.

The sub-sequence, which may also be referred to as a word, may be between two consecutive delimiters, or separated according to a more complex rule based on delimiters in the sequence.

The machine learning model may be comprised in a machine learning module together with logic for preprocessing, flow management, control, and/or the like. The machine learning model may be based on neural networks such as convolutional neural networks, transformer networks, networks with memory such as recurrent neural networks (RNN), long short term memory (LSTM), gated recurrent units (GRU), support vector machines, naïve Bayes classifier, decision trees, random forests, architectures that may be developed in the future, a combination thereof, and/or the like.

The exemplary process 200 continues, as shown in 213, with determining selected layout using the set of probabilities.

The layout may be selected from a set of installed layouts, and may correspond to one or more languages and one or more dictionaries, wherein the selected layout correspond to a more probable language and/or dictionary, wherein a dictionary correspond to a language, however may be specialized, such as jargon or abbreviation dictionary. The dictionaries may be stored on the volatile memory 112, on persistent storage 116, or cached from a more remote part of the memory such as the public cloud 150.

And subsequently, the exemplary process 200 continues, as shown in 214, with applying the selected layout on at least one word of a plurality of words, wherein the plurality of words correspond to previous and consecutive sub-sequences from the sequence.

Applying the layout may be on text being typed and/or correction of a word already displayed on a display of the UI set 126 or of the end user device 132. according to the language, and may comprise replacing some or all of the characters or tokens of the word with characters, optionally comprised in tokens, from one or more languages to which the selected layout correspond.

Figure 3A:
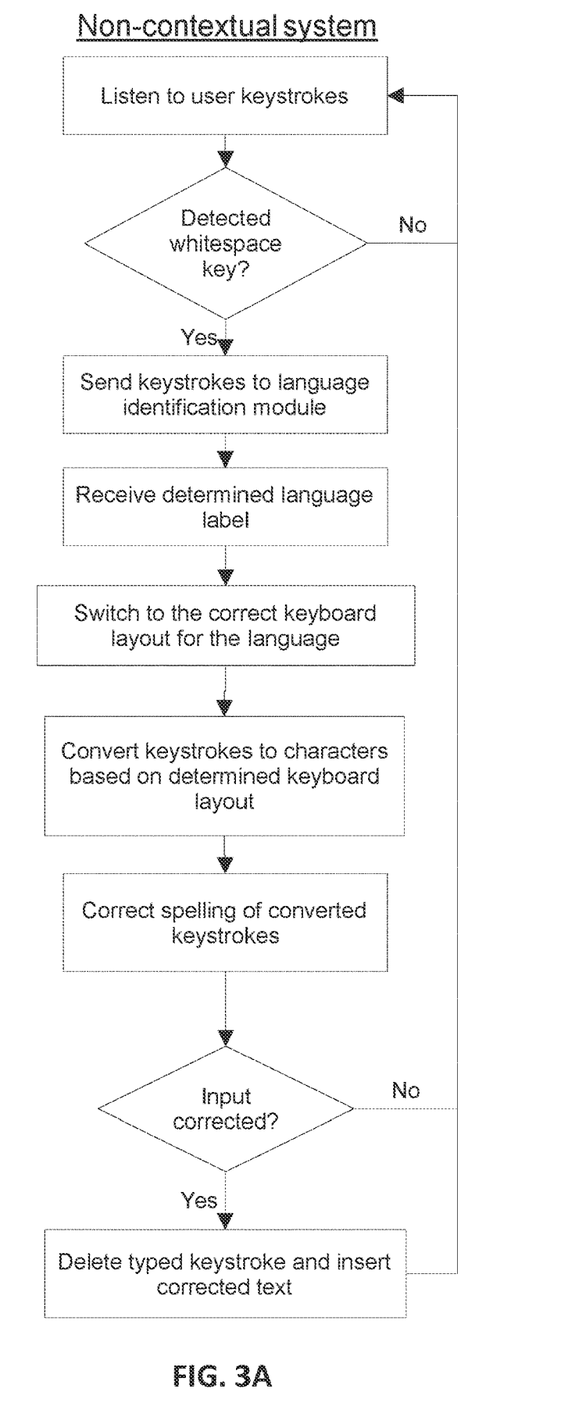
FIG. 3A is a flowchart of an exemplary process in a non-contextual system for lingual correction, according to some embodiments of the present disclosure.

Reference is also made to FIG. 3A, which is a flowchart of an exemplary process in a non-contextual system for lingual correction, according to some embodiments of the present disclosure.

The process may comprise receiving a sequence of user gestures by listening to user keystrokes, or other gestures such as touches and swipes on a virtual keyboard displayed on a touch screen, and accumulating a sequence of possible characters, tokens, and/or the like which may be of a language determined in a preset manner, in a former iteration, or manually selected by a user. When the triggered key is not a delimiter, such as a whitespace, newline, comma, or like, add it to a sub-sequence which may also be referred to as a word.

When a triggering of a delimiter, whitespace key which may be fixed between different keyboard layouts is detected the sequence of gestures and/or keystrokes since the beginning or former whitespace triggering may be sent to a language identification module. Each layout of the multi-layout keyboard is associated with a language, dialect, jargon, icon set, mode, or the like.

Followingly, the language identification module may process the sequence and generate a determined language label, which the system followingly receives. Followingly, the system may switch to the correct keyboard layout for the language, as determined according to the determined label received.

Followingly, the system may convert keystrokes to characters based on determined keyboard layout, wherein a gesture on a touch screen and/or pressing of one of more keys consecutively or simultaneously or the like may be converted to a one or more characters associated with the determined language.

Followingly, the system may correct the spelling of the words as determined by the converted keystrokes or gestures.

When the determined language was modified, it may be stated that the input is corrected. In response thereto, the system may delete typed characters or letters as displayed on a form, widget, and/or the like, as based on a formerly determined language, and insert a corrected text, instead of the deleted characters, using characters corresponding to keys of the determined layout. Such action may also be referred to as apply correction according to the language to words in response to the selected layout. When such updating occurs after a language change, one or more corresponding character in a displayed sentence comprising words from a different language associated with a different layout using a spelling dictionary of a language associated with the selected layout.

It should be noted that as used herein, the term dictionary refers to generalized lists of words, which may or may not be accompanied with interpretation and/or embedding and include words, abbreviations, acronyms, sets of symbols, sequences of characters which may be featured for graphic appearance or used as a code, and/or the like.

Figure 3B:
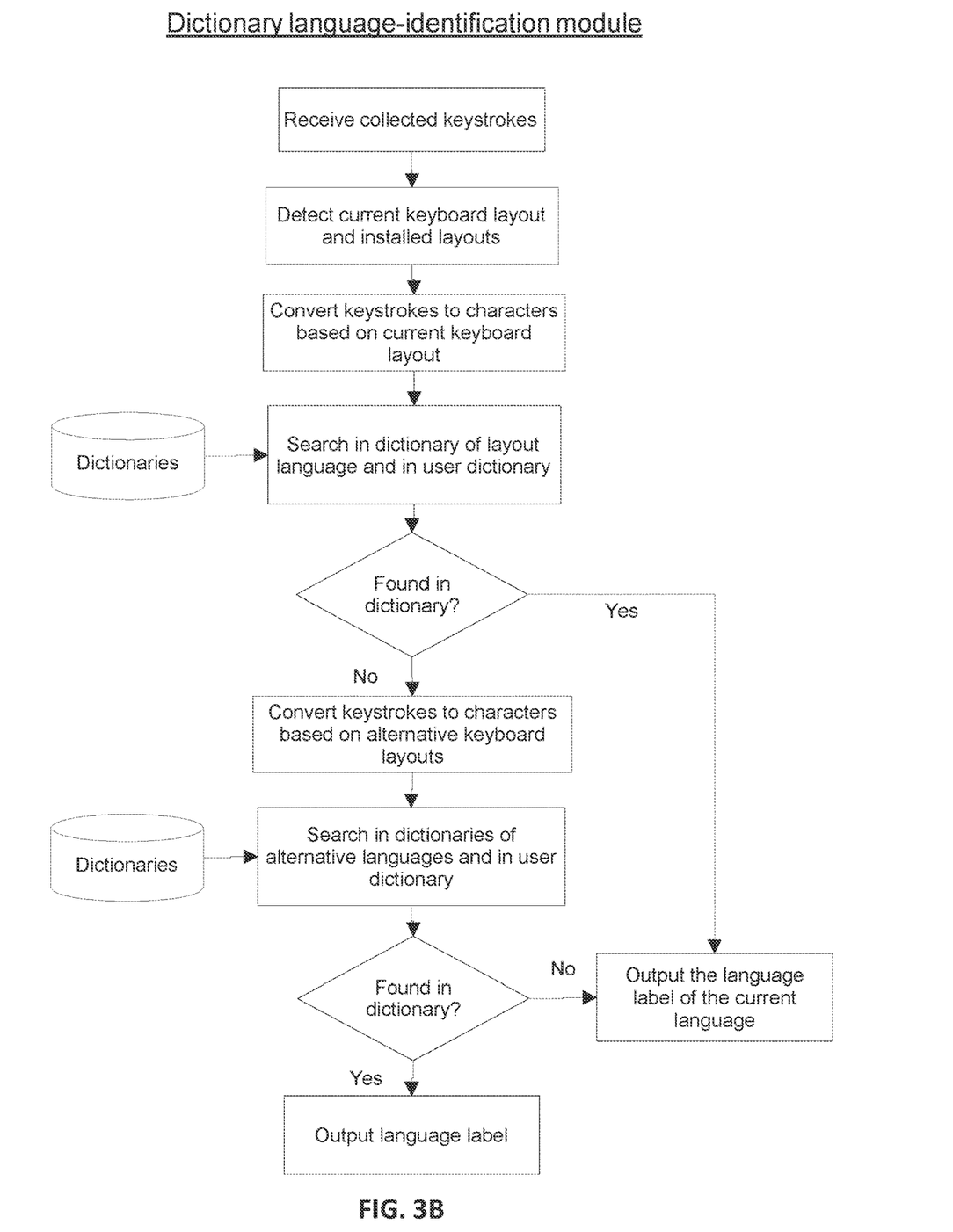
FIG. 3B is flowchart of an exemplary process for dictionary language identification in a system for lingual correction, according to some embodiments of the present disclosure.

Reference is also made to FIG. 3B, which is flowchart of an exemplary process for dictionary language identification in a system for lingual correction, according to some embodiments of the present disclosure.

The process may comprise receiving the collected keystrokes from a keyboard, physical or virtual, similarly to the process described in FIG. 3A.

The process may further comprise detecting the current keyboard layout and other installed layouts available on the system.

The process may convert keystrokes to characters based on alternative keyboard layouts, for example the current keyboard layout and other layouts installed on the system.

Followingly the process may search in one or more user dictionaries which may be associated with a layout and a corresponding language and in set of words enabled thereby for best matches for the collected keystrokes or gestures. When the word is found in a dictionary associated with the current language, output the language label of the current layout which is associated therewith.

When the word is not found in a dictionary associated with the current language. The process may continue by converting keystrokes to characters based on alternative keyboard layout. This may be done by searching the dictionaries of alternative languages and in one or more user dictionaries When the word is found in a dictionary associated with the current language Output the corresponding language label. Some implementations may consider partial matches, for example by autocompleting a word, by a distance measure which may consider the number of mismatches and the key or gesture distance, a combination thereof, or the like.

When no match is found, the system may output the language label of the current language.

Figure 3C:
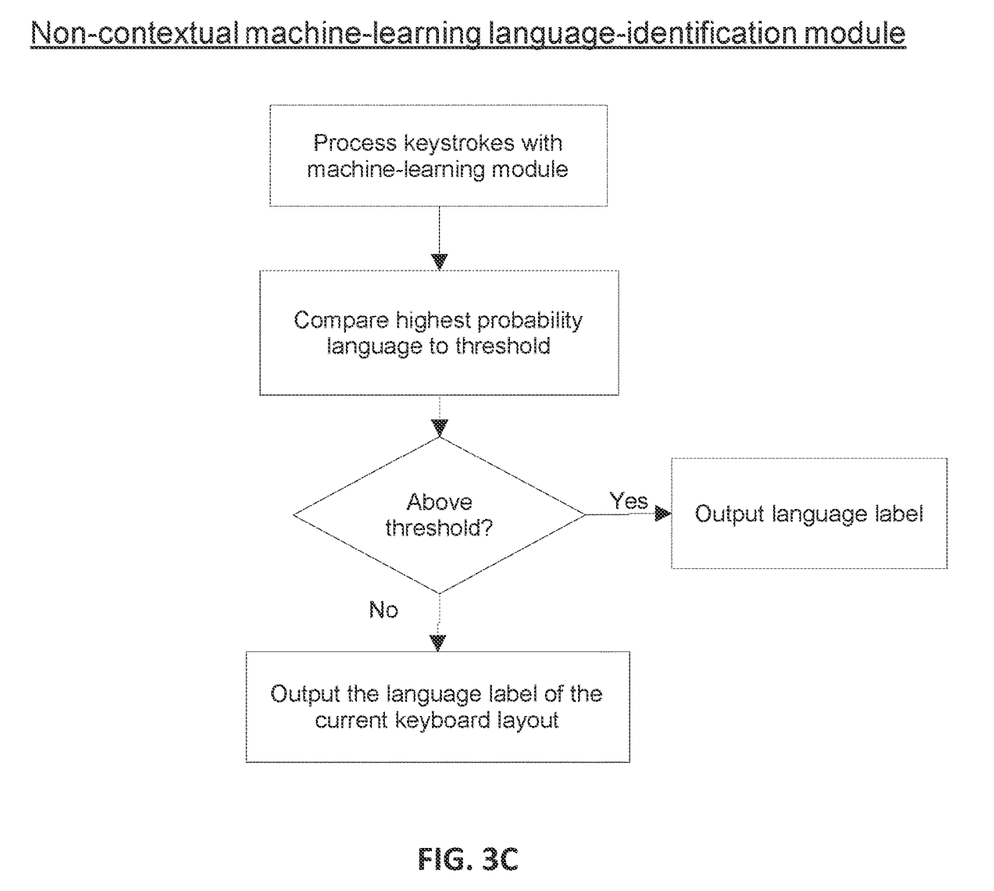
FIG. 3C is a flowchart of an exemplary process of a non-contextual machine learning language identification module in a system for lingual correction, according to some embodiments of the present disclosure.

Reference is also made to FIG. 3C, which is a flowchart of an exemplary process of a non-contextual machine learning language identification module in a system for lingual correction, according to some embodiments of the present disclosure.

Some implementations may identify a current keyboard layout of the plurality of keys and whether the current layout was manually switched, and how recently. The selected language accordingly may be determined using a threshold based on the set of probabilities, the current layout, number of recent manual switches of language, presence of characters, such as quotes, and/or the like.

The process may process gestures or keystrokes using a machine-learning module, which may comprise a machine learning model such as a transformer neural network, LSTM, GRU, Random forest classifier, Markov random fields (MRF), an older architecture, a different existing model, or a model that may be developed in the future, as well as some knowledge representation component such as coded rules, wrapping logic, and/or the like.

Followingly, when a higher probability is assigned to a language other than the current, the language may be referred to as the highest probability language and the process may compare the highest probability assigned to language to threshold. The threshold may be fixed, configurable, or depend on application type, how recently a language was manually selected, and/or other factors.

When the higher probability which is assigned to the language other than the current is above a threshold, which may be fixed, or updated using methods such as online learning, which may be supervised for example by following words, explicit language selection by user, The process may output the language label of the highest probability language.

When the higher probability which is assigned to the language other than the current is below the threshold Output the language label of the current keyboard layout.

Figure 4A:
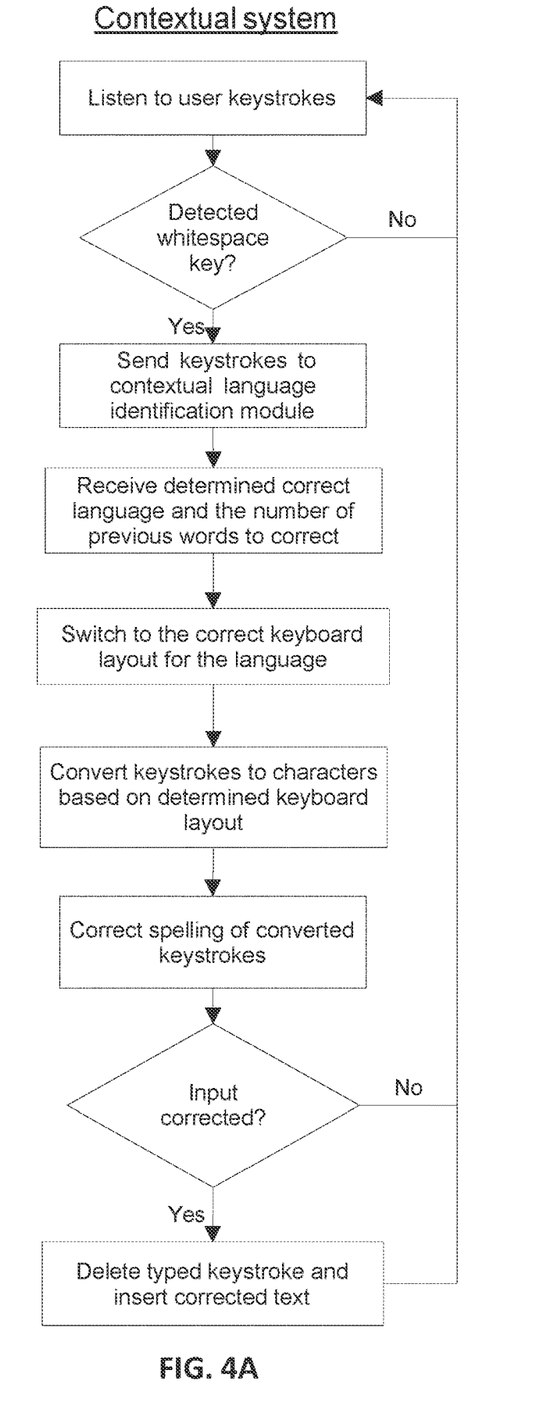
FIG. 4A is a flowchart of an exemplary process in a contextual system for lingual correction, according to some embodiments of the present disclosure.

Reference is also made to FIG. 4A, which is a flowchart of an exemplary process in a contextual system for lingual correction, according to some embodiments of the present disclosure.

The process may listen to user keystrokes, including other gestures, and add to a sequence until detected a delimiter, such as a whitespace key. In response to the delimiter, send keystrokes to contextual language identification module and receive a determined correct language, optionally with a number of previous words to correct by interpreting the keystrokes according to a layout corresponding to the language identified.

Contextual systems may generate a set of probabilities for a subsequence, often a word, using at least one additional subsequence extracted from the sequence using the delimiter.

Followingly the process may convert keystrokes to characters based on determined keyboard layout correct spelling of converted keystrokes Delete typed keystroke and insert corrected text using the characters.

Figure 4B:
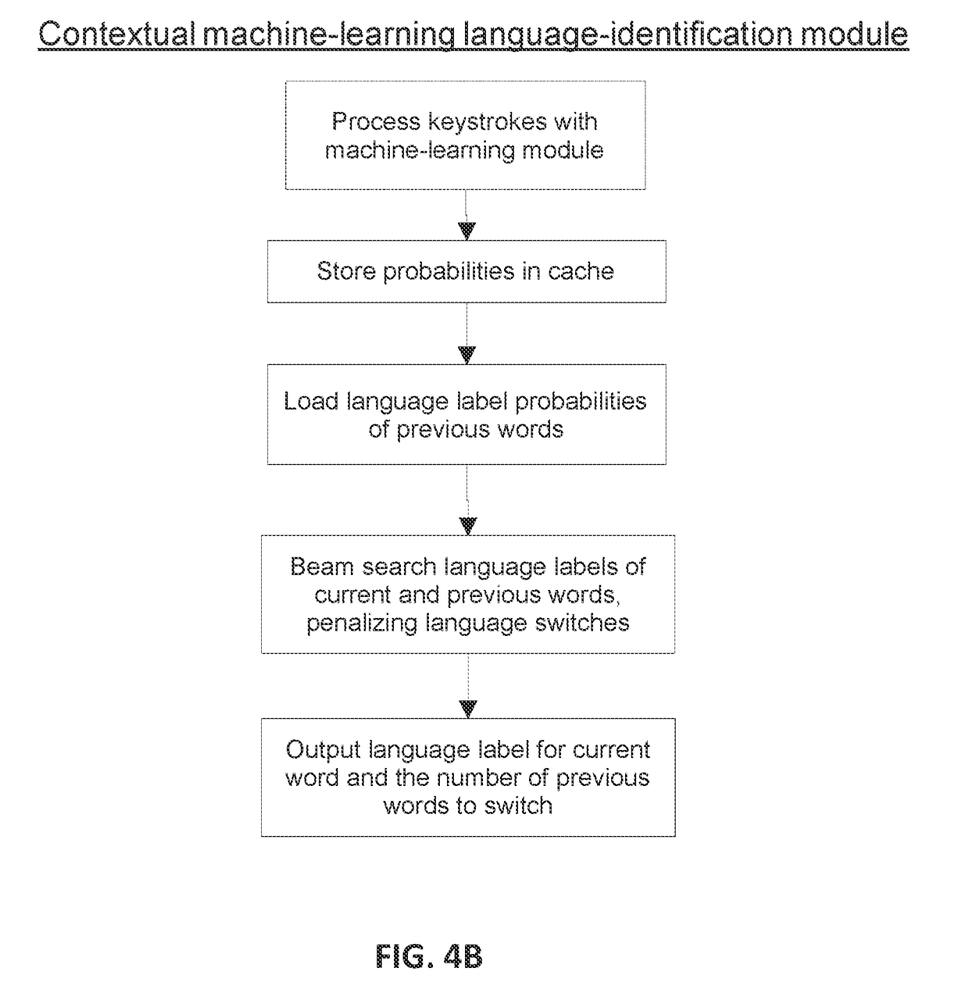
FIG. 4B is a flowchart of an exemplary process of a contextual machine learning language identification module in a system for lingual correction, according to some embodiments of the present disclosure.

Reference is also made to FIG. 4B, which is a flowchart of an exemplary process of a contextual machine learning language identification module in a system for lingual correction, according to some embodiments of the present disclosure. The process may start by processing gestures or keystrokes using a machine-learning module.

Followingly, the process may store the probabilities in a cache, which may be on a system's processor cache, physical memory, virtual memory, and/or the like. The process may followingly load language probabilities of previously typed words, and optionally other contextual factors.

The process may followingly apply a graph search, such as depth first search, breadth first search, beam search or the like, for finding language labels of current and previous words. The optimization may apply penalizing on language switches, as these are not likely to be very frequently deliberate.

Herein the set of probabilities may be generated using a graph search on a set of subsequence comprising the at least one additional subsequence, and a target function minimizing number of language switches between adjacent graph nodes corresponding to adjacent subsequences, which are frequently words.

Followingly, the process may output a corresponding language label for current word and optionally a number of previous words to switch the language and keyboard layout for.

Figure 5:
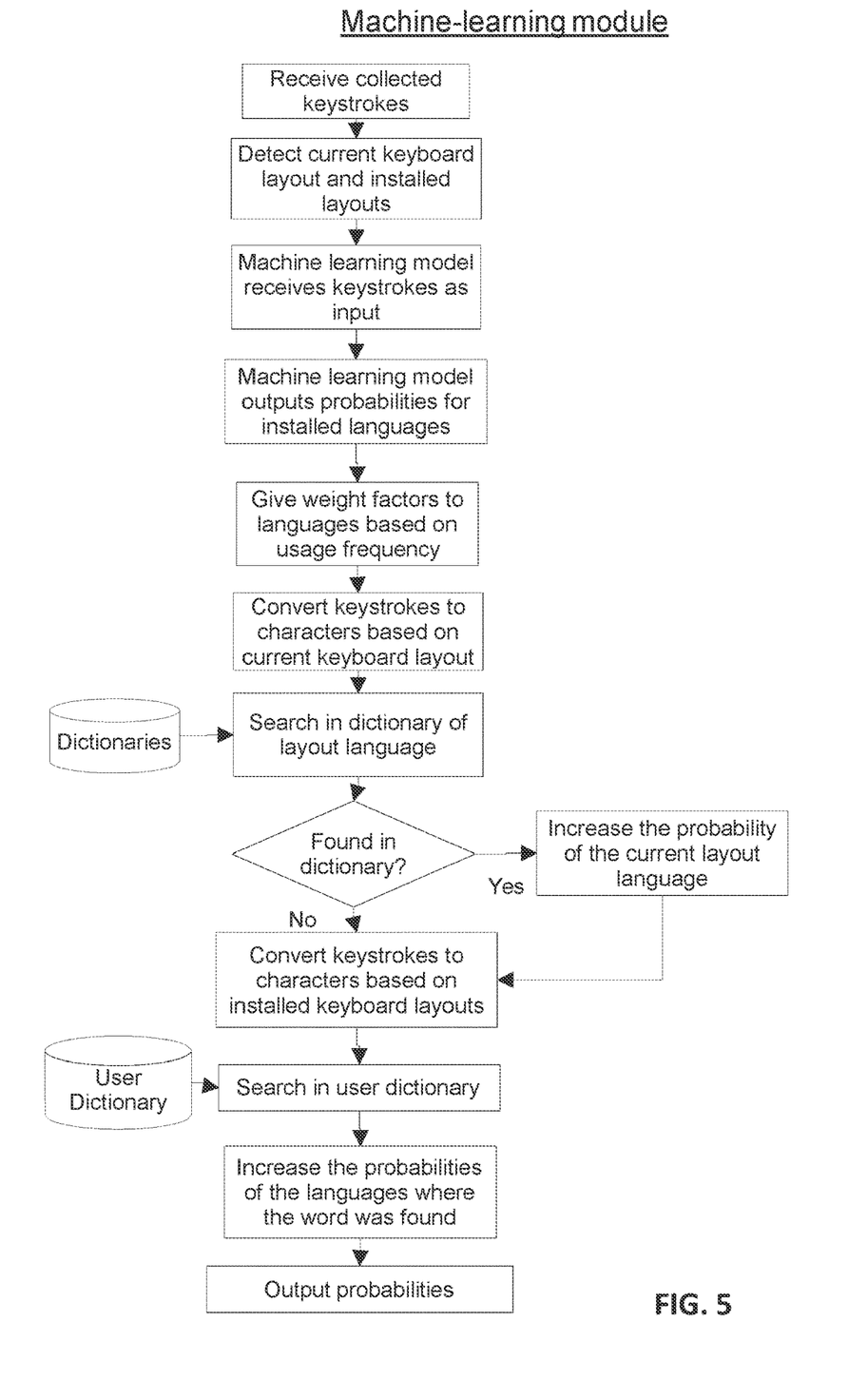
FIG. 5 is a flowchart of an exemplary process of a machine learning module in a system for lingual correction, according to some embodiments of the present disclosure.

Reference is also made to FIG. 5, which is a flowchart of an exemplary process of a machine learning module in a system for lingual correction, according to some embodiments of the present disclosure.

The process may start by receiving collected keystrokes or gestures from a keyboard, touch screen, camera, or different sensor.

Followingly, the process may detect current keyboard layout and other installed layouts, which may also be made accessible to a machine learning model.

Followingly, the machine learning model may receive the keystrokes, gestures, or processed features thereof as input.

Followingly, the machine learning model may output probabilities for installed languages and optionally give weight factors to language based on usage frequencies.

Note that a one to one relation of gestures or keystrokes to characters may be frequently one to one, however the general case is many to many relation.

Followingly, the module may search in dictionary of the current or newly selected layout languages.

When the word is found in the dictionary, the module may increase the probability of the current layout, or otherwise search in user dictionaries for a layout for which a better match exists.

When a layout for which a better match exists is found, the module may convert the keystrokes or gestures to characters based on the keyboard layout for which a better match exists. Followingly, the module may increase the probability of the language corresponding to the layout for which a better match exists. The module may conclude the process by outputting probabilities of the layouts and/or corresponding languages.

Figure 6:
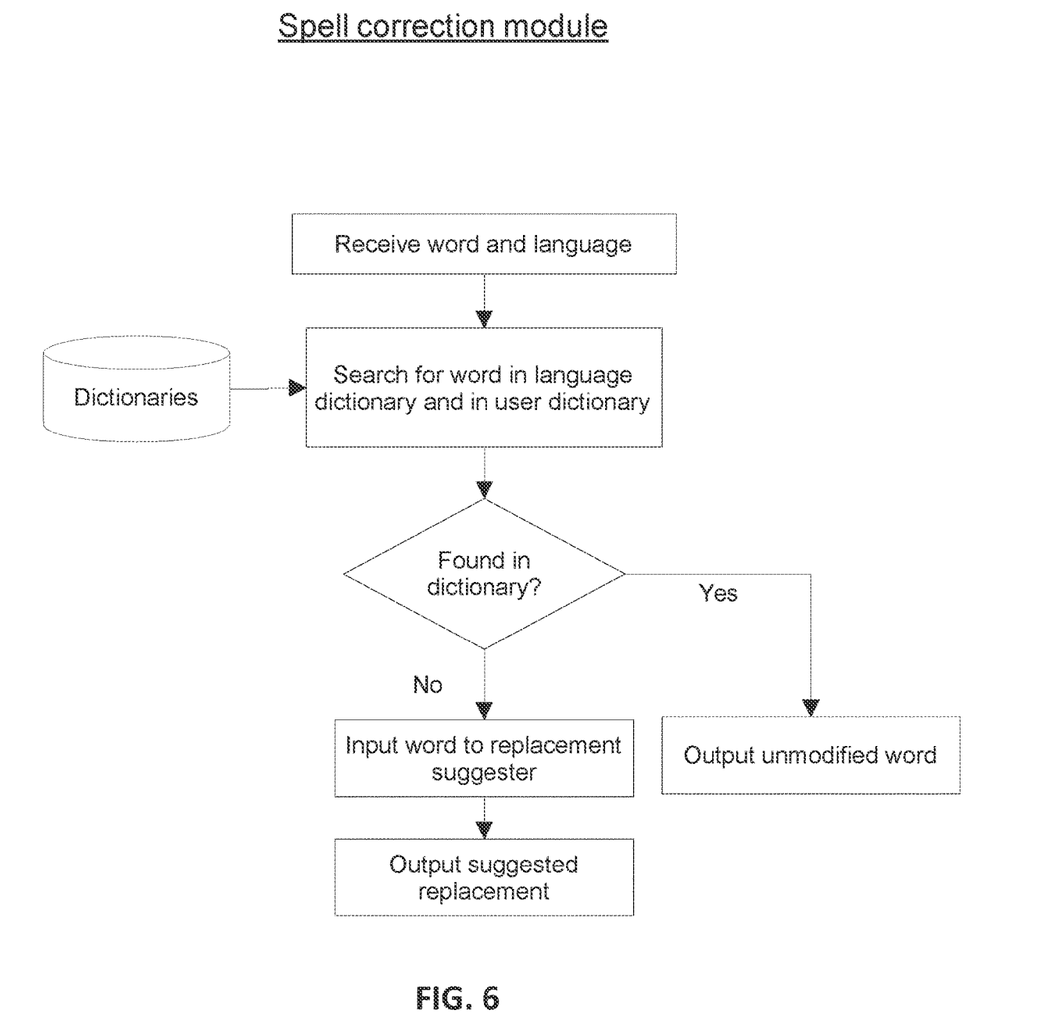
FIG. 6 is a flowchart of an exemplary process of spell correction in a system for lingual correction, according to some embodiments of the present disclosure.

Reference is also made to FIG. 6, which is a flowchart of an exemplary process of spell correction in a system for lingual correction, according to some embodiments of the present disclosure.

The process of the spell correction module may first receive a word and a language to which the word is expected to be related.

Followingly the spell correction module process may search for word in one or more language dictionaries and in user dictionaries, including jargon, abbreviation and/or the like.

When the word is found in a dictionary in the former step, the process may conclude with outputting the unmodified word Input word to replacement.

When the word is not found in a dictionary the word may be fed to a replacement suggester module, and use one or more suggestions generated by the replacement suggester for outputting the suggested replacements.

Figure 7:
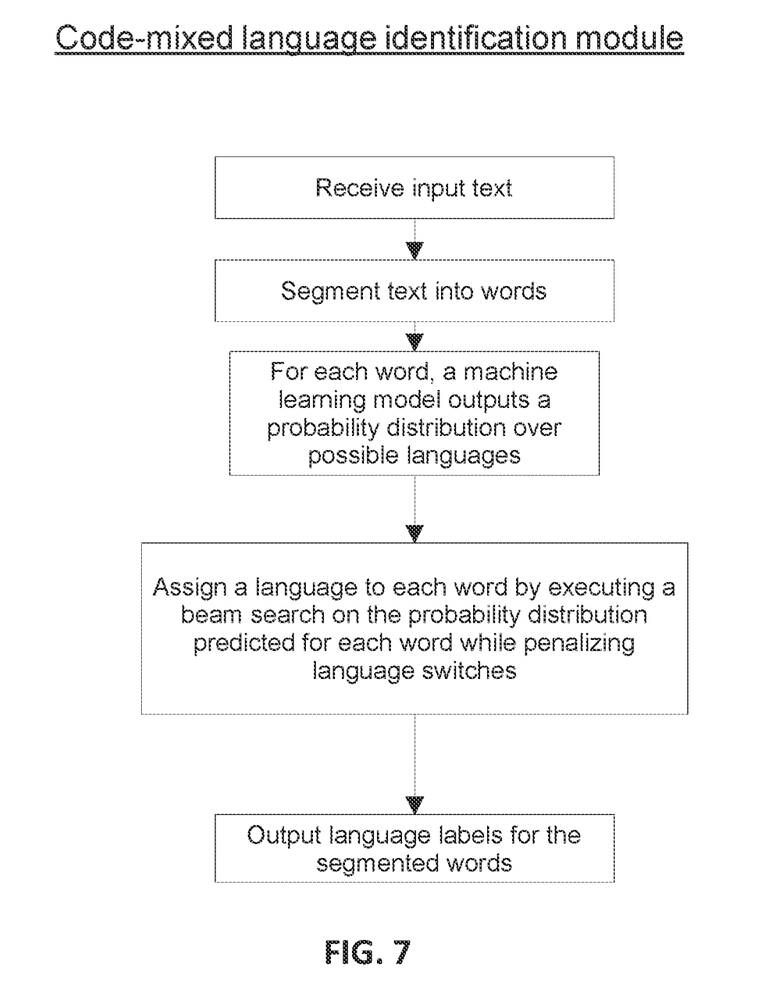
FIG. 7 is a flowchart of an exemplary process of code-mixed language identification in a system for lingual correction, according to some embodiments of the present disclosure.

Reference is also made to FIG. 7, which is a flowchart of an exemplary process of code-mixed language identification in a system for lingual correction, according to some embodiments of the present disclosure.

The code-mixed language identification module may execute using the processor set 110 a processes beginning by receiving input text.

Followingly, the process may segment the text into words using delimiters such as a whitespace, a comma, a period, a tab, and/or the like. The words may be fed into a machine learning model.

Followingly, for each word, the machine learning model may outputs a probability distribution over possible languages, for example the languages installed on the system.

Followingly, the code-mixed language identification module may assign a language to each word by executing a graph search, for example beam search on the probability distribution predicted for each word while penalizing language switches. The process may conclude by the code-mixed language identification module outputting language labels for the segmented words.

It is expected that during the life of a patent maturing from this application many relevant machine learning methods will be developed and the scope of the term machine learning model, as well as the term neural networks intended to include all such new technologies a priori.

The terms "comprises", "comprising", "includes", "including", "having" and their conjugates mean "including but not limited to".

As used herein, the singular form "a", "an" and "the" include plural references unless the context clearly dictates otherwise. For example, the term "a compound" or "at least one compound" may include a plurality of compounds, including mixtures thereof.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicants that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for lingual correction using a multi-layout keyboard comprising:
   receive a sequence of user gestures corresponding to a multi-layout keyboard, wherein each layout of the multi-layout keyboard corresponding to a language and comprising a plurality of keys, each key corresponds to at least one character, at least one key in each of the layouts is designated and at least one gesture on the at least one key is assigned as a delimiter;
   generate a set of probabilities by processing at least one sub-sequence extracted from the sequence using the delimiter by a machine learning model;
   determine a selected layout using the set of probabilities;
   apply the selected layout on at least one word of a plurality of words, wherein the plurality of words correspond to previous and consecutive sub-sequences from the sequence; and
   in response to the selected layout apply correction according to the language on the at least one word;
   delete typed characters or letters as displayed on a form and/or widget, as based on a formerly determined language, and insert a corrected text, instead of the deleted characters or deleted letters, using characters corresponding to keys of the selected layout.

2. The method of claim 1, further comprising in response to the selected layout update at least one corresponding character in a displayed sentence comprising the at least one word from an additional language associated with an additional layout using a spelling dictionary of a language associated with the selected layout.

3. The method of claim 1, wherein the set of probabilities is generated using at least one additional subsequence extracted from the sequence using the delimiter.

4. The method of claim 3, wherein the set of probabilities is generated using a graph search on a set of subsequence comprising the at least one additional subsequence, and a target function minimizing number of language switches between adjacent graph nodes corresponding to adjacent subsequences.

5. The method of claim 1, further comprising identifying a current layout of the plurality of keys and whether the current layout was manually switched.

6. The method of claim 5, wherein the selected language is determined using a threshold based on the set of probabilities and the current layout.

7. A device comprising:
   a processor; and
   a display in communication with the processor, wherein the processor is configured to:
      receive a sequence of user gestures corresponding to a multi-layout keyboard, wherein each layout of the multi-layout keyboard corresponding to a language and comprising a plurality of keys, each key corresponds to at least one character, at least one key in each of the layouts is designated and at least one gesture on the at least one key is assigned as a delimiter;

generate a set of probabilities by processing at least one sub-sequence extracted from the sequence using the delimiter by a machine learning model;

determine a selected layout using the set of probabilities;

apply the selected layout on at least one word of a plurality of words, wherein the plurality of words correspond to previous and consecutive sub-sequences from the sequence; and in response to the selected layout apply correction according to the language on the at least one word;

wherein the processor is further configured to delete typed characters or letters as displayed on a form and/or widget, as based on a formerly determined language, and insert a corrected text, instead of the deleted characters or deleted letters, using characters corresponding to keys of the selected layout.

8. The device of claim 7, further comprising in response to the selected layout update at least one corresponding character in a displayed sentence comprising the at least one word from an additional language associated with an additional layout using a spelling dictionary of a language associated with the selected layout.

9. The device of claim 7, wherein the set of probabilities is generated using at least one additional subsequence extracted from the sequence using the delimiter.

10. The device of claim 9, wherein the set of probabilities is generated using a graph search on a set of subsequence comprising the at least one additional subsequence, and a target function minimizing number of language switches between adjacent graph nodes corresponding to adjacent subsequences.

11. The device of claim 7, further comprising identifying a current layout of the plurality of keys and whether the current layout was manually switched.

12. The device of claim 11, wherein the selected language is determined using a threshold based on the set of probabilities and the current layout.

13. A computer readable storage medium having instructions stored thereon, which, when executed by a computer, cause the computer to carry out a method for lingual correction using a multi-layout keyboard comprising:

receive a sequence of user gestures corresponding to a multi-layout keyboard, wherein each layout of the multi-layout keyboard corresponding to a language and comprising a plurality of keys, each key corresponds to at least one character, at least one key in each of the layouts is designated and at least one gesture on the at least one key is assigned as a delimiter;

generate a set of probabilities by processing at least one sub-sequence extracted from the sequence using the delimiter by a machine learning model;

determine a selected layout using the set of probabilities;

apply the selected layout on at least one word of a plurality of words, wherein the plurality of words correspond to previous and consecutive sub-sequences from the sequence; and in response to the selected layout apply correction according to the language on the at least one word;

wherein the method for lingual correction further comprising delete typed characters or letters as displayed on a form and/or widget, as based on a formerly determined language, and insert a corrected text, instead of the deleted characters or deleted letters, using characters corresponding to keys of the selected layout.

14. The device of claim 7, further comprising On-Device Training Model which is continuously trained based on the user's typing data.

* * * * *